(12) United States Patent
Perry et al.

(10) Patent No.: US 12,556,270 B2
(45) Date of Patent: Feb. 17, 2026

(54) VALIDATING THE SERVICE CONTINUITY OF DEPLOYED FIBER SERVING TERMINALS

(71) Applicant: AT&T Intellectual Property I, L.P., Atlanta, GA (US)

(72) Inventors: Ricky Perry, Cumming, GA (US); Kristofer Flores, Allen, TX (US); Todd Swenson, Pearland, TX (US); Wendy Thompson, Stendal, IN (US); Shawn Turner, Burleson, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 273 days.

(21) Appl. No.: 18/513,465

(22) Filed: Nov. 17, 2023

(65) Prior Publication Data
US 2025/0167886 A1    May 22, 2025

(51) Int. Cl.
*H04B 10/00* (2013.01)
*H04B 10/077* (2013.01)
*H04B 10/079* (2013.01)
*H04L 41/0631* (2022.01)
*H04L 67/00* (2022.01)
*H04J 14/00* (2006.01)

(52) U.S. Cl.
CPC ..... *H04B 10/0773* (2013.01); *H04B 10/0793* (2013.01); *H04L 41/0631* (2013.01); *H04L 67/34* (2013.01)

(58) Field of Classification Search
CPC .. H04B 10/07; H04B 10/073; H04B 10/0731; H04B 10/075; H04B 10/077; H04B 10/0779
See application file for complete search history.

(56) References Cited

U.S. PATENT DOCUMENTS

| | | | |
|---|---|---|---|
| 2014/0093239 A1* | 4/2014 | Griswold | H04Q 11/0067 398/45 |
| 2015/0270895 A1* | 9/2015 | Fink | H04Q 11/0067 398/16 |
| 2021/0099473 A1* | 4/2021 | Fainberg | H04L 63/1416 |

* cited by examiner

*Primary Examiner* — Daniel G Dobson (57) ABSTRACT

A method for validating service continuity of deployed fiber serving terminals in a passive optical network includes broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network, changing a counter in response to each response message that is received from the plurality of beacon responders in response to the beacon signal, and generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

20 Claims, 4 Drawing Sheets

VALIDATING THE SERVICE CONTINUITY OF DEPLOYED FIBER SERVING TERMINALS

The present disclosure relates generally to fiber broadband network infrastructure, and relates more particularly to devices, non-transitory computer-readable media, and methods for validating the service continuity of deployed fiber serving terminals.

BACKGROUND

Passive optical networks (PONs) are fiber broadband networks that utilize a type of fiber deployment in which no electrical hardware is deployed in the fiber plant. Implementation of a new fiber deployment for a PON typically involves engineering and the physical placement of the PON infrastructure (e.g., feeder fibers, fiber distribution cabinets, 1:N power splitters, distribution fibers, fiber serving terminals (FSTs), and fiber drops (extensions from the FSTs to the customer sites)) in the serving area. The PON infrastructure may be placed so that the infrastructure can be connected to all dwellings in the serving area, regardless of whether those dwellings are occupied or currently subscribed to services delivered via the PON.

SUMMARY

In one example, the present disclosure describes a device, computer-readable medium, and method for validating the service continuity of deployed fiber serving terminals in a passive optical network. For instance, in one example, a method for validating the service continuity of deployed fiber serving terminals in a passive optical network includes broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network, changing a counter in response to each response message that is received from the plurality of beacon responders in response to the beacon signal, and generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

In another example, a non-transitory computer-readable medium stores instructions which, when executed by a processing system of an optical splitter including at least one processor, cause the processing system to perform operations. The operations include broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network, changing a counter in response to each response message that is received from the plurality of beacon responders in response to the beacon signal, and generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

In another example, a system includes a processing system including at least one processor and a non-transitory computer-readable medium storing instructions which, when executed by the processing system, cause the processing system to perform operations. The operations include broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network, changing a counter in response to each response message that is received from the plurality of beacon responders in response to the beacon signal, and generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for validating the service continuity of deployed fiber serving terminals. As discussed above, implementation of a new fiber deployment for a PON typically involves engineering and the physical placement of the PON infrastructure (e.g., feeder fibers, fiber distribution cabinets, 1:N power splitters, distribution fibers, fiber serving terminals (FSTs), and fiber drops (extensions from the FSTs to the customer sites)) in the serving area. The PON infrastructure may be placed so that the infrastructure can be connected to all dwellings in the serving area, regardless of whether those dwellings are occupied or currently subscribed to services delivered via the PON.

Since a potentially long amount of time (e.g., several months to years) may pass between deployment of the PON infrastructure and connection of the first subscriber to the FST, continuity loss to the FST may occur. Continuity loss refers to an impairment of the FST due to fiber damage (e.g., from digging, wildlife, or the like), faulty installations (e.g., installations that may have been improperly deployed from the start), incorrect provisioning, or the like. If continuity to the FST has been lost, a technician most likely will need to be dispatched to repair the FST and restore continuity so that the subscriber may connect to the PON. This may increase costs to the PON operator as well as lead to decreased subscriber satisfaction due to the delay in establishing service. Although solutions exist for monitoring FST continuity, these solutions are typically costly to implement. For instance, centralized optical time domain reflectometer (OTDR)-based solutions require components such as fiber taps, reflectors, and the like to be deployed for each fiber to be monitored. Moreover, OTDR-based solutions are typically not implemented until after continuity loss has been detected.

Examples of the present disclosure provide a system that broadcasts beacons from a network element located in a central office of a PON. A beacon responder, which is plugged into an FST of the PON, responds to the beacon with a response message that is unique to the FST. The response message may be received by the network element and used to verify that the FST is functioning properly and capable of receiving signals from the central office via the PON. If the beacon responder fails to respond to the beacon, then the network element may report the lack of response and/or initiate a remedial action to diagnose and/or repair the FST.

In one example, the beacon responder includes a processor (e.g., a nanochip) and an internal, self-contained power source. The processor may further include a random bit generator to generate a random bit, which may then be added to the response message to ensure that the response message is unique to the FST (e.g., can be distinguished from response messages sent by other beacon responders plugged into other FSTs in the PON). Thus, examples of the present disclosure provide a lower cost approach to validating that a deployed FST in a PON is functional and service-ready. These and other aspects of the present disclosure are discussed in further detail with reference to FIGS. 1-4, below.

Figure 1:
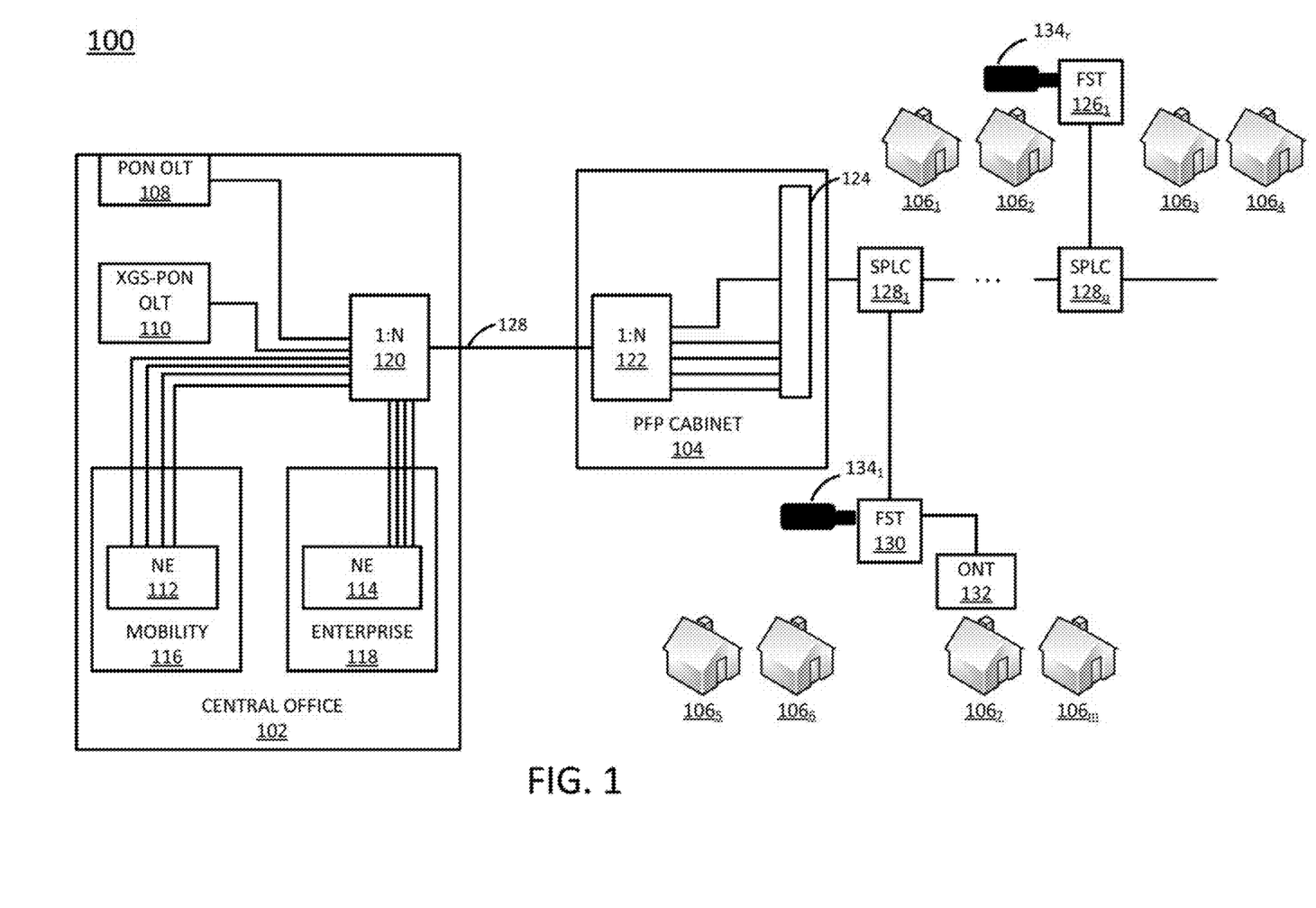
FIG. 1 illustrates an example system in which examples of the present disclosure for validating the service continuity of deployed fiber serving terminals may operate.

To further aid in understanding the present disclosure, FIG. 1 illustrates an example system 100 in which examples of the present disclosure for validating the service continuity of deployed fiber serving terminals may operate. The system 100 may comprise at least a portion of an optical distribution network (ODN). In one example, the system 100 generally comprises a send side comprising a central office (or head end) 102 and a receive side comprising a primary flexibility point (PFP) cabinet 104 and a plurality of customer sites $106_1$-$106_m$ (hereinafter individually referred to as a "customer site 106" or collectively referred to as "customer sites 106").

The central office 102 comprises a hub or centrally located point in the system 100 at which a conglomerate signal is distributed to optical nodes (e.g., in neighborhoods or premises locations). The conglomerate signal may carry voice, data, and/or video services to the customer sites 106. In one example, the central office 102 may include one or more optical line terminals (OLTs) 108 and 110. The OLTs 108 and 110 comprise the starting points of fiber optic access networks, such as a 25G or 50G PON or a higher speed XGS-PON. The central office 102 may further include one or more network elements (NEs) 112 and 114 supporting one or more service networks, such as a mobility network 116, an enterprise network 118, or another type of service network.

The OLTs 108 and 110, as well as the NEs 112 and 114, may all be connected (e.g., via Ethernet cables) to a first optical splitter 120. The first optical splitter 120 may be a 1:N optical splitter that is capable of receiving up to N transmission signals (e.g., from the OLTs 108 and 110 and the NEs 112 and 114) and converging the N transmission signals onto a single backbone feeder fiber 128.

In another example (i.e., an example more representative of a conventional wavelength division multiplexing (WDM) architecture), the transmission signals from the NEs 112 and 114 may be processed by filters and multiplexers which would receive as input multiple signals of different wavelengths (e.g., colors) and combine those multiple signals into a single combined signal containing all of the multiple wavelengths. For instance, each NE 112 or 114 could output its respective transmission signals to one or more filter/multiplexer combinations (not shown) to produce one or more combined signals. The combined signals would then be input (along with respective transmission signals from OLTs 108 and 110) to a single fiber combining module (e.g., another multiplexer, not shown) that would separate the individual wavelengths out from the combined signals before outputting selected individual wavelengths onto the backbone feeder fiber 128.

Referring back to the example illustrated in FIG. 1, the NEs 112 and 114 may output their transmission signals directly to the first optical splitter 120, i.e., without those transmission signals having to be combined into a single combined signal by a filter/multiplexer combination. The first optical splitter 120 can therefore output the conglomerate signal (comprising the transmission signals from the OLTs 108 and 110 and the NEs 112 and 114, which may be of multiple different wavelengths) via the backbone feeder fiber 128.

On the receive side, the cabinet 104 comprises an enclosure which houses a second optical splitter 122 and a distribution fiber cable termination panel 124. In one example, the second optical splitter 122 is a 1:N optical splitter that receives (via the backbone feeder fiber 128) the conglomerate signal that is output by the first optical splitter 120 in the central office 102. The second optical splitter 122 separates the single conglomerate signal into up to N individual signals of different wavelengths (e.g., one wavelength or range of wavelengths per individual signal) and delivers the up to N individual signals to the distribution fiber cable termination panel 124 for distribution to the customer sites 106. In a conventional WDM architecture such as that discussed above, an external multiplexer (i.e., external to the cabinet 104) would typically be required to separate the conglomerate signal into the individual signals prior to the individual signals entering the cabinet 104.

From the distribution fiber cable termination panel 124, the up to N individual signals may be delivered to a plurality of FSTs $126_1$-$126_p$ (hereinafter individually referred to as an "FST 126" or collectively referred to as "FSTs 126") via a plurality of respective factory splices (SPLCs) $128_1$-$128_q$ (hereinafter individually referred to as a "splice 128" or collectively referred to as "splices 128"), also sometimes referred to as "tethers").

In one example, each FST 126 is associated with one or more customer sites 106, such as homes, offices, cellular base stations (e.g., eNodeBs in long term evolution networks or gNodeBs in fifth generation networks) and other network termination equipment (NTE), radio nodes and sensors (e.g., picoradio nodes), and other customer sites. Thus, each signal of the up to N individual signals may be routed via the distribution fiber cable termination panel 124 to the FST 126 associated with the customer site 106 that is the destination for the signal. Each of the up to N individual signals may be presented via one or more native service interfaces to users at the customer sites 106. These services may include voice (e.g., plain old telephone service, voice over Internet Protocol, etc.), data (e.g., Ethernet, V.35, etc.), video, and/or telemetry services.

In fiber-to-the-premises (FTTP) connections, the fiber optic cable runs all the way into the customer sites 106 and is connected directly to an optical network terminal (ONT) 132 which converts fiber signals (i.e., pulses of light) into data that can be rendered by user endpoint devices at the customer site 106, such as personal computers, set top boxes, smart televisions, and the like. FIG. 1 illustrates one ONT 132 at the customer site 1067, indicating that service is to be established at the customer site 1067. However, as illustrated, some of the other customer sites 106 associated with the FST 130 do not have ONTs, indicating that service has not yet been established and/or requested for those customer sites 106.

According to examples of the present disclosure, FSTs 130 of the system 100 may be provided with a respective beacon responder $134_1$-$134_r$ (hereinafter individually referred to as a "beacon responder 134" or collectively referred to as "beacon responders 134"). In one example, every FST 130 may be provided with a respective beacon responder 134; however, in other examples, some FSTs 130 may be provided with respective beacon responders 134 while other FSTs 130 may not be provided with beacon responders 134.

In one example, each beacon responder 134 may comprise an apparatus that can be plugged into a port of a fiber strand and the FST 130 that is cross-connected to a splitter located in the PFP cabinet 104. Thus, a beacon responder 134 can be easily added to or removed from an FST 130. In one example, each beacon responder 134 may include, at minimum, a processor (e.g., a nanochip) that includes a random number generator and an internal, self-contained power source (e.g., such that the beacon responder 134 does not need to draw power from the FST 130). In another example, each beacon responder 134 may be configured in a manner similar to the computing device 400 illustrated in FIG. 4. Thus, in other examples, each beacon responder may include one or more additional components such as memory, non-transitory computer-readable media, and the like.

In practice, one of the NEs 112 or 114 at the central office 102 may broadcast a beacon signal that is designed to identify which FSTs 130 are functioning properly and which FSTs 130 are not functioning properly. The NE 112 or 114 may send the beacon signal according to a predefined schedule, on a periodic basis (e.g., once every x hours, days, weeks, months, or the like), on-demand (e.g., in response to an explicit request from an operator of the system 100), or according to any other frequency. The beacon signal may be broadcast to every beacon responder 134 in the system 100.

In response to receiving the beacon signal, a beacon responder 134 may generate a random bit and add the random bit to a response message. The beacon responder 134 may then send the response message, including the random bit, back to the NE 112 or 114 from which the beacon signal was received.

In response to receiving the response message, the NE 112 or 114 may identify the beacon responder 134 from which the response message was received, based on the random bit that is added to the response message. The random bit may be unique for every beacon responder 134, and thus may help the NE 112 or 114 to uniquely identify the beacon responder 134 that is the source of a response message. Further in response to receiving the response message, the NE 112 or 114 may increment (e.g., by one) a counter that keeps count of the number of response messages received after the beacon signal is sent.

In one example, the NE 112 or 114 may wait a predefined period of time (e.g., y seconds or minutes) after sending a beacon signal. If, upon expiration of the predefined period of time, the counter indicates the receipt of a number of response messages that is fewer than an expected number, then the NE 112 or 114 may conclude that at least one beacon responder 134 has not responded to the beacon signal. For instance, if the system includes n FSTs 130, then n responses messages may be expected in response to a broadcast beacon signal. Thus, if the counter indicates the receipt of a number of response messages that is fewer than n, then this may indicate that at least one beacon responder 134 has not responded to the beacon signal. The lack of response message from the at least one beacon responder 134 may indicate that the FST 130 associated with the at least one beacon responder 134 (e.g., the FST 130 into which the at least one beacon responder 134 is plugged) is malfunctioning.

Moreover, because the NE 112 or 114 is able to identify beacon responders 134 based on the unique random bits that the beacon responders 134 added to the response messages, the NE 112 or 114 may be able to identify the beacon responder(s) from which a response message has not been received within the predefined period of time. Thus, the NE 112 or 114 may notify an operator of the system 100 that one or more FSTs 130 within the system are malfunctioning and may identify the malfunctioning FSTs 130 to the operator. In further examples, the NE 112 or 114 may initiate a remedial action to diagnose and/or repair the malfunctioning FSTs 130. For instance, the NE 112 or 114 may cause another device to push a software update to the malfunctioning FSTs 130, to run a troubleshooting or diagnostic process on the malfunctioning FSTs 130, to schedule examination of the malfunctioning FSTs 130 by a technician, to order replacement FSTs 130 or components to replace the malfunctioning FSTs 130, or the like.

It should be noted that the system 100 has been simplified. Thus, those skilled in the art will realize that the system 100 may be implemented in a different form than that which is illustrated in FIG. 1, or may be expanded by including additional endpoint devices, access networks, network elements, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

Figure 2:
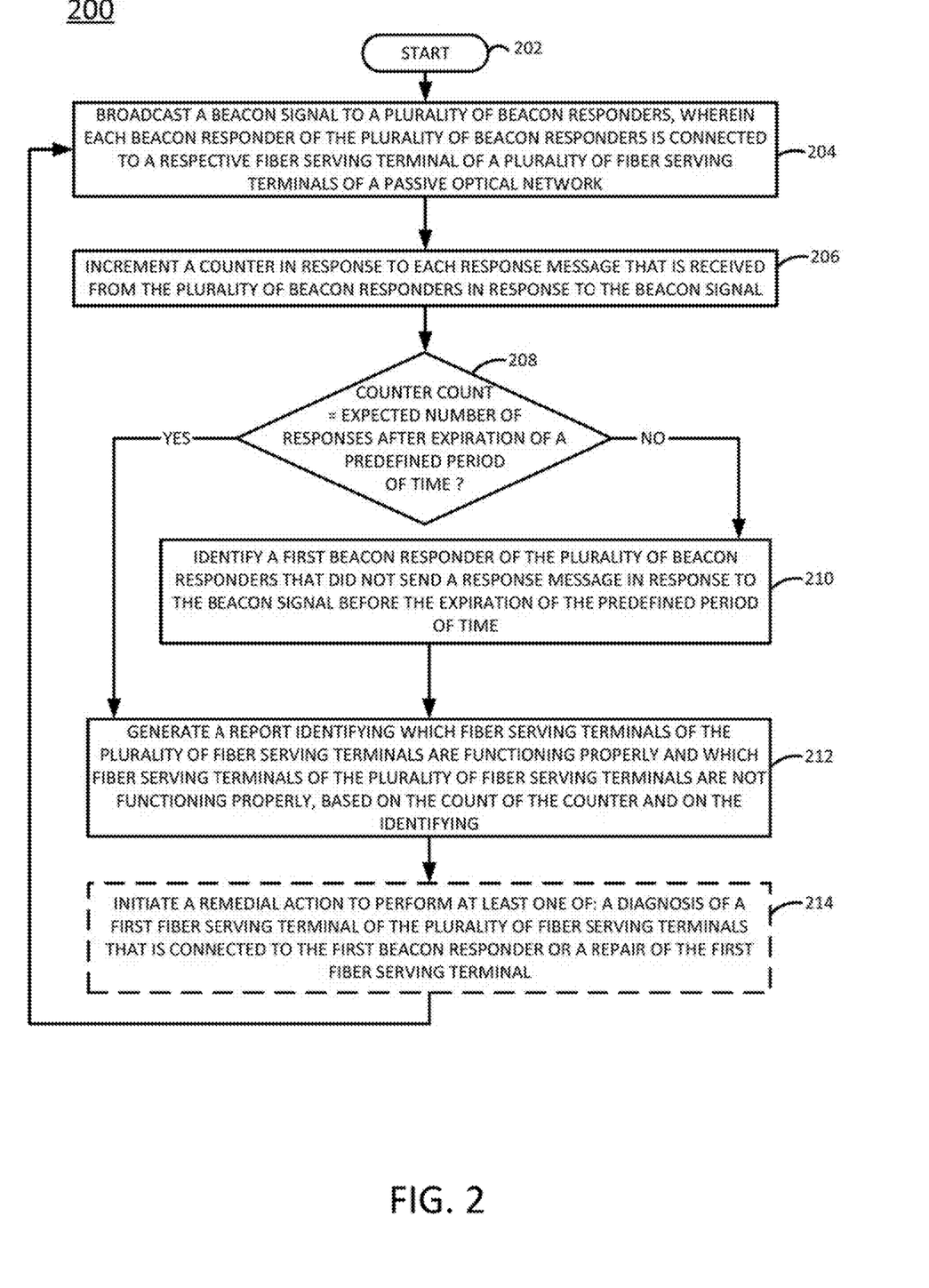
FIG. 2 illustrates a flowchart of an example method for validating the service continuity of deployed fiber serving terminals.

To further aid in understanding the present disclosure, FIG. 2 illustrates a flowchart of an example method 200 for validating the service continuity of deployed fiber serving terminals. In one example, the method 200 may be performed by one of the network elements 112 or 114 illustrated in FIG. 1, or one or more components of the network elements 112 or 114. However, in other examples, the method 200 may be performed by another device, such as the computing system 400 of FIG. 4, discussed in further detail below. For the sake of discussion, the method 200 is described below as being performed by a processing system (where the processing system may comprise a component of a network element of a central office of a PON, the computing system 400, or another device).

The method 200 begins in step 202. In step 204, the processing system may broadcast a beacon signal to a plurality of beacon responders, wherein each beacon responder of the plurality of beacon responders is connected to a respective fiber serving terminal of a plurality of fiber serving terminals of a passive optical network.

In one example, the processing system may be part of a network element of a central office of the PON. The plurality of FSTs may be FSTs that have already been installed as part of the PON, but have not yet been activated for service. That is, at least some of the FSTs may not currently be providing service to a customer site. Each beacon responder of the plurality of beacon responders may be plugged into (or otherwise connected to) a port of a fiber strand in a respective FST that is cross-connected to a splitter located in a PFP cabinet of the PON. The beacon signal may be broadcast on a backbone feeder fiber of the PON and distributed to the plurality of FSTs via a PFP cabinet and/or factory splices.

In step 206, the processing system may increment a counter in response to each response message that is received from the plurality of beacon responders in response to the beacon signal. In one example, the counter may be used to keep a count of the number of response messages that is received in response to the beacon signal. Thus, the processing system may increment the counter once (e.g., by a value of one) each time a response message is received. Alternatively, the method may implement a count down from a total number of expected responses, e.g., counting down by one after receipt of each response message.

In one example, each response message may comprise an out-of-band response. Each response message may travel from a respective beacon responder back through the factory splices, PFP cabinet, and/or backbone feeder fiber back to the processing system (i.e., traveling the reverse direction along the same path as that by which the beacon signal was received by the respective beacon responder).

In step 208, the processing system may determine whether a count of the counter is equal to an expected number of responses, after an expiration of a predefined period of time. In one example, the expected number of responses may be equal to the number of beacon responders deployed in the PON (which may, in turn, be equal to the number of FSTs in the PON). That is, the processing system may expect to receive one response message from each beacon responder deployed in the PON. In this case, if the count of the counter is equal to the expected number of responses, then this may indicate that every beacon responder that is deployed in the PON has received and responded to the beacon signal, and that every FST may therefore be assumed to be functioning properly (i.e., to be in a condition that is capable of providing broadband service to a customer site).

If, however, the count of the counter is less than the expected number of responses, then this may indicate that at least one beacon responder in the PON has not received the beacon signal and/or is unable to respond to the beacon signal, and may therefore be assumed to be connected to an FST that is not functioning properly (i.e., to not be in a condition that is capable of providing broadband service to a customer site). For instance, an FST may not be functioning properly due to fiber damage (e.g., from digging, wildlife, or the like), faulty installations (e.g., installations that may have been improperly deployed from the start), incorrect provisioning, or the like.

In one example, the predefined period of time may be configurable by an operator of the PON. Thus, the predefined period of time may be set to a period of time that the operator considers reasonable for every beacon responder connected to a properly functioning FST to respond to the beacon signal. If a beacon responder does not respond to the beacon signal within the predefined period of time, then, as discussed above, this may be an indication that the non-responding beacon responder is connected to an FST that is not functioning properly.

If the processing system concludes in step 208 that the count of the counter is not equal to the expected number of responses, after the expiration of the predefined period of time, then the method 200 may proceed to step 210. In step 210, the processing system may identify a first beacon responder of the plurality of beacon responders that did not send a response message in response to the beacon signal before the expiration of the predefined period of time.

In one example, each response message that is received by the processing system may contain a unique signature. The unique signature may uniquely identify a specific beacon responder, and only that specific beacon responder, to the processing system. In one example, the unique signature may comprise a randomly generated bit that is added by a corresponding beacon responder to its response message.

The processing system may therefore be able to determine, by process of elimination, which beacon responders have not provided responses messages. For instance, if the processing system has access to a list of all beacon responders that have been deployed in the PON, and that list includes identifiers of the FSTs connected to the beacon responders and unique signatures for each of the beacon responders, then the processing system may compare the signatures in the list to the signatures that have been attached to the received response messages. Any signatures that are included in the list, but not included in the received response messages, may be assumed to be associated with beacon responders that have not responded to the beacon signal and may therefore be connected to FSTs that are not functioning properly.

Once the first beacon responder has been identified, the method 200 may proceed to step 212. Alternatively, if the processing system concludes in step 208 that the count of the counter is equal to the expected number of responses, after the expiration of the predefined period of time, then the method 200 may proceed directly to step 212 from step 208 (i.e., bypassing step 210). In step 212, the processing system may generate a report indicating which fiber serving terminals of the plurality of fiber serving terminals are functioning properly and which fiber serving terminals of the plurality of fiber serving terminals are not functioning properly, based on the count of the counter on the identifying.

For instance, any FSTs that are connected to beacon responders from which a response message has been received may be identified and indicated to be functioning properly in the report. Conversely, any FSTs that are connected to beacon responders from which a response message has not been received may be identified and indicated to be potentially not functioning properly in the report.

In optional step 214 (illustrated in phantom), the processing system may initiate a remedial action to perform at least one of: a diagnosis of a fiber serving terminal of the plurality of fiber serving terminals that is connected to the first beacon responder or a repair of the first fiber serving terminal.

In one example, once the first FST has been determined to potentially not be functioning properly (e.g., due to the processing system not receiving a response message from the first beacon responder within the predefined period of time), the processing system may initiate a diagnostic or troubleshooting process in order to attempt to identify a root cause of the malfunction. In one example, initiating the diagnostic or troubleshooting process may involve sending further signals to the first FST, where some of the further signals may include instructions for the first FST to perform certain operations. The ability of the first FST to perform these operations in the manner instructed may help the processing system to remotely identify the root cause of the malfunction, or at least to eliminate one or more potential root causes.

In another example, initiating the diagnostic or troubleshooting process may involve sending instructions to other devices, such as sensors, to collect information about the first FST, and to send the collected information to the processing system for further analysis and/or forwarding to a technician. For instance, the processing system may send instructions to a network probe to collect signaling data from the PON (which may indicate a location in the PON beyond which signals fail to transmit), to a drone to capture images of the first FST (which may reveal physical defects such as fiber damage), or the like.

In another example, initiating the diagnostic or troubleshooting process may involve scheduling examination of the first FST by a technician. For instance, if the processing system is unable to remotely diagnose the root cause of the malfunction, physical inspection of the first FST by a technician may be necessary.

In another example, if the processing system may initiate an action to repair the first FST. For instance, if the processing system is able to identify the root cause of the malfunction, the processing system may be able to further identify a repair that can remediate the root cause and to initiate an action to carry out the repair. In one example, the processing system may push or may cause another device (e.g., an application server) to push a software update to the first FST, where installation of the software update on the first FST may be expected to cause the first FST to begin functioning properly. In another example, the processing system may order or may cause another device (e.g., a computing system) to order a replacement FST or a replacement component for a component of the first FST (where installation of the replacement component in the first FST may be expected to cause the first FST to begin functioning properly).

The method 200 may then return to step 204 and may proceed as described above, beginning with the broadcast of a next beacon signal. For instance, as discussed above, the processing system may send beacon signals according to a predefined schedule, on a periodic basis (e.g., once every x hours, days, weeks, months, or the like), on-demand (e.g., in response to an explicit request from an operator of the PON), or according to any other frequency. Each time the processing system sends a new beacon signal, one or more of steps 204-214 may be repeated. In this manner, the processing system may continuously monitor the plurality of FSTs until the plurality of FSTs have been activated for service and are actively providing one or more services to customer sites in the PON.

Figure 3:
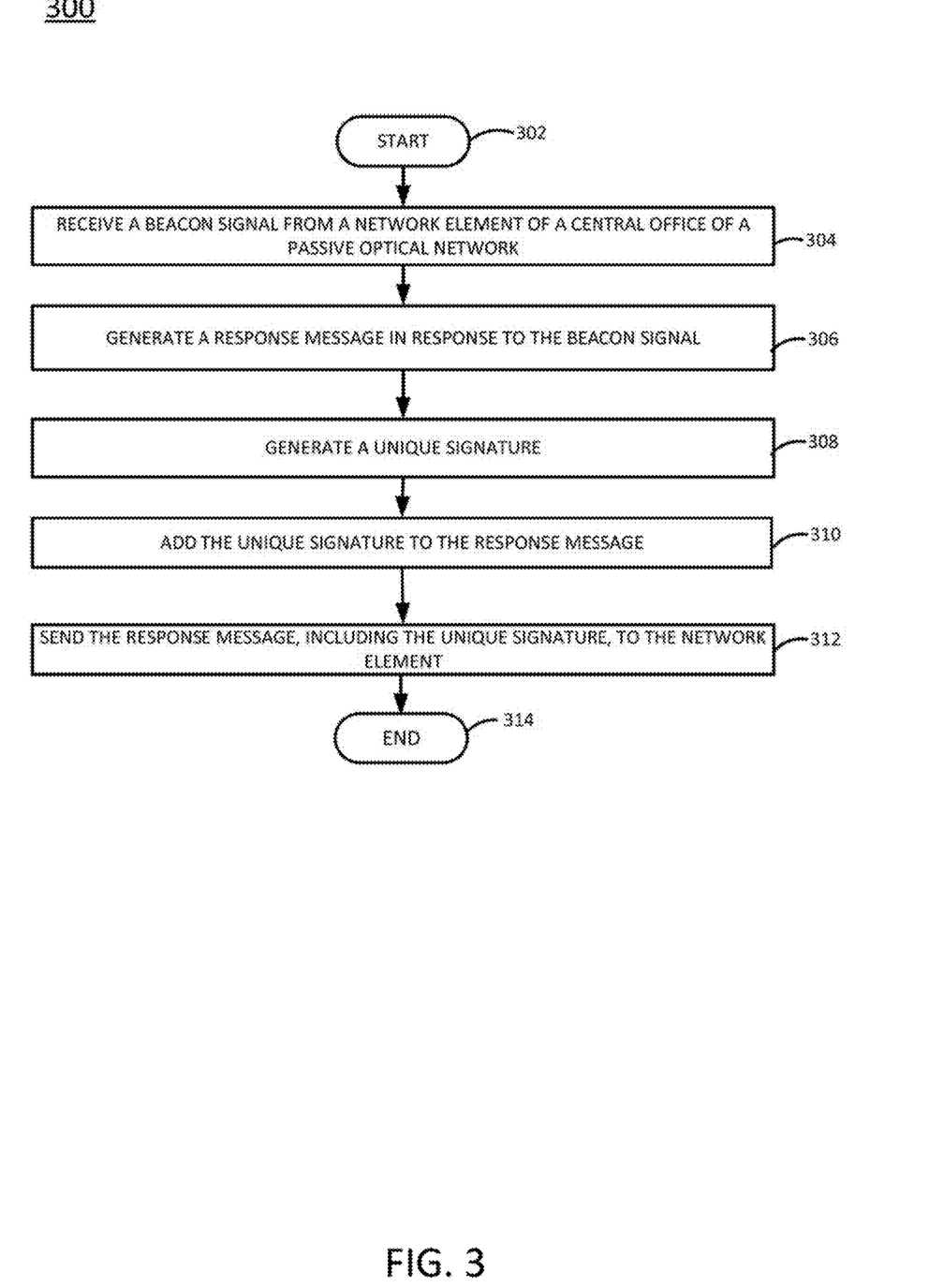
FIG. 3 illustrates a flowchart of an example method for validating the service continuity of deployed fiber serving terminals.

FIG. 3 illustrates a flowchart of an example method 300 for validating the service continuity of deployed fiber serving terminals. In one example, the method 300 may be performed by one of the beacon responders 134 illustrated in FIG. 1, or one or more components of the beacon responders 134. However, in other examples, the method 300 may be performed by another device, such as the computing system 400 of FIG. 4, discussed in further detail below. For the sake of discussion, the method 300 is described below as being performed by a processing system (where the processing system may comprise a component of a beacon responder that is connected to an FST of a PON, the computing system 400, or another device).

The method 300 begins in step 302. In step 304, the processing system may receive a beacon signal from a network element of a central office of a passive optical network.

In one example, the processing system may be part of a beacon responder that is connected to an FST of the PON. For instance, the processing system may be part of a nanochip that controls operations of the beacon responder and is powered by an internal, self-contained power source. The beacon responder may be plugged into a port of a fiber strand in the FST that is cross-connected to a splitter located in a PFP cabinet of the PON.

In step 306, the processing system may generate a response message in response to the beacon signal. In one example, the response message may comprise a signal that indicates that the processing system has received the beacon signal.

In step 308, the processing system may generate a unique signature. In one example, the unique signature may comprise a random bit. For instance, the processing system may include or control a random bit generator. In this case, each time the processing system generates a response message to respond to a received beacon signal, the processing system may also control the random bit generator to generate a random bit. In other examples, however, other types of unique signatures or identifiers may be used, as long as the signature or identifier is unique among signatures or identifiers corresponding to other processing systems (e.g., other beacon responders) within the PON.

In step 310, the processing system may add the unique signature to the response message. For instance, if the signature is a random bit as described above, the random bit may be added to a payload or to a header of a packet containing the response message.

In step 312, the processing system may send the response message, including the unique signature, to the network element. In one example, the response message may travel the same path through the PON as the beacon signal, but in the reverse direction. For instance, the response message may travel from the processing system back through factory splices, PFP cabinets, and/or backbone feeder fibers back to the source of the beacon signal (which may comprise a network element of a central office of the PON). The method 300 may end in step 314.

Although not expressly specified above, one or more steps of the method 200 or the method 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Moreover, it should be noted that when the terms "first," "second," "third," or the like are used herein to refer to items (such as an "FST," a "beacon responder," or the like), these terms are meant only to differentiate between two or more different items of the same type. In other words, such terms are not necessarily meant to imply that a particular number of items exists or is required for operation of the present disclosure. Nor is a reference to a "second," "third," or the like item meant to imply that a "first," "second," or the like item exists or is required.

Figure 4:
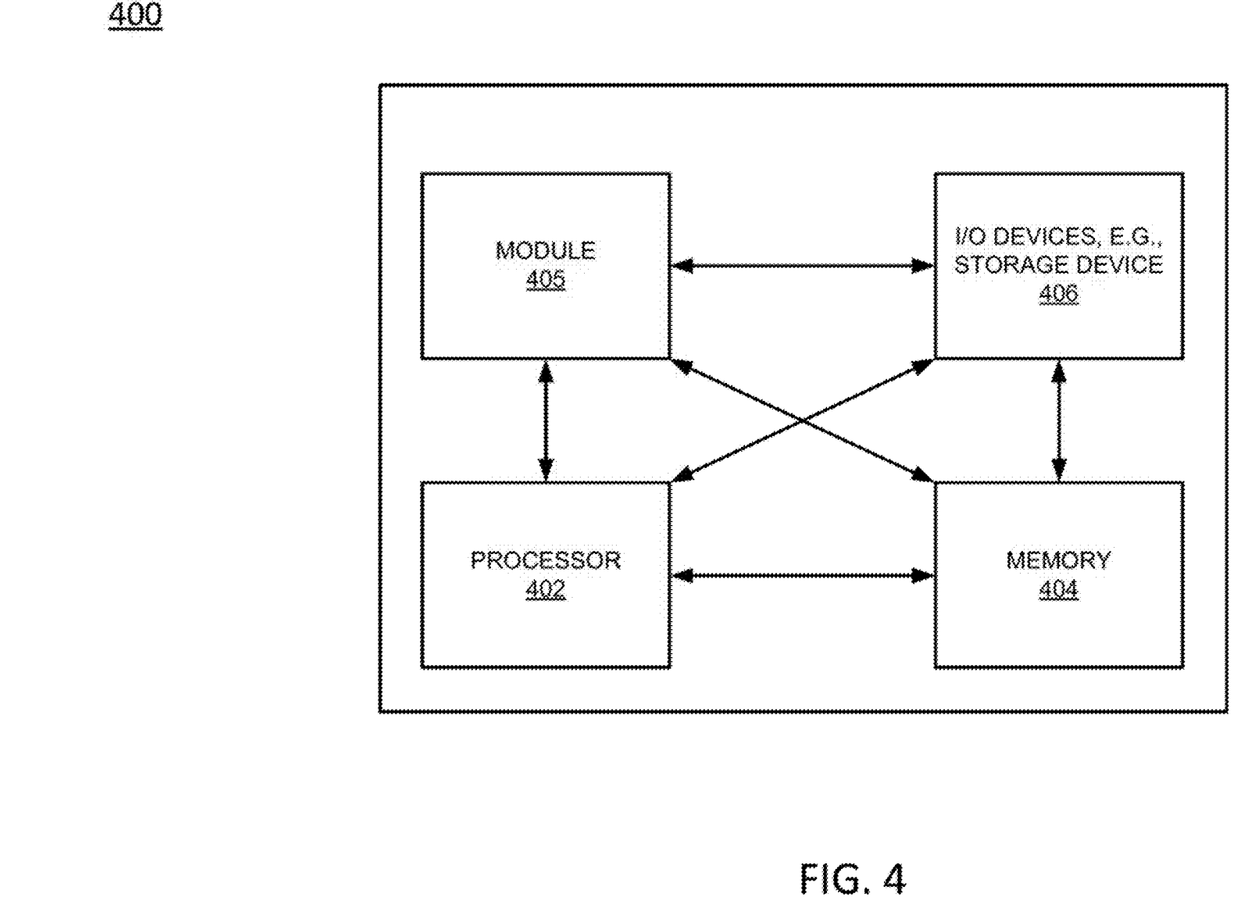
FIG. 4 depicts a high-level block diagram of a computing device specifically programmed to perform the functions described herein.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, one of the network elements 112 or 114 of FIG. 1 (such as might be used to perform the method 200) or one of the beacon responders 134 of FIG. 1 (such as might be used to perform the method 300) could be implemented as illustrated in FIG. 4.

As depicted in FIG. 4, the system 400 comprises a hardware processor element 402, a memory 404, a module 405 for validating the service continuity of deployed fiber serving terminals, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for validating the service continuity of deployed fiber serving terminals may include circuitry and/or logic for performing special purpose functions relating to detecting and isolating wavelengths of optical transmissions. The input/output devices 406 may include, for example, storage devices (including but not limited to, a tape drive, a floppy drive, a hard disk drive or a compact disk drive), a receiver, a transmitter, a transceiver, an electrical interface, an optical interface, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for validating the service continuity of deployed fiber serving terminals (e.g., a software program comprising computer-executable instructions) can be loaded into memory 404 and executed by hardware processor element 402 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for validating the service continuity of deployed fiber serving terminals (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
broadcasting, by a processing system of a central office of a passive optical network, a beacon signal to a plurality of beacon responders, wherein each beacon responder of the plurality of beacon responders is connected to a respective fiber serving terminal of a plurality of fiber serving terminals of the passive optical network;
changing, by the processing system, a counter in response to each response message that is received from the plurality of beacon responders in response to the beacon signal; and
generating, by the processing system, a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

2. The method of claim 1, wherein the processing system is part of a network element of the central office.

3. The method of claim 1, wherein the plurality of fiber serving terminals comprises fiber serving terminals that have already been installed as part of the passive optical network, but have not yet been activated to provide a service to a customer site.

4. The method of claim 1, wherein each beacon responder of the plurality of beacon responders is plugged into a port of a fiber strand in the respective fiber serving terminal that is cross-connected to a splitter located in a primary flexibility point cabinet of the passive optical network.

5. The method of claim 4, wherein the beacon signal is broadcast on a backbone feeder fiber of the passive optical network and distributed to the plurality of fiber serving terminals via the primary flexibility point cabinet.

6. The method of claim 1, wherein the count is incremented once for every response message of the each response message that is received.

7. The method of claim 1, wherein the generating comprises:
   determining, by the processing system, that the count of the counter is equal to the expected number of responses, after the expiration of the predefined period of time; and
   indicating, by the processing system in response to the determining, in the report that all fiber serving terminals of the plurality of fiber serving terminals are functioning properly.

8. The method of claim 1, wherein the generating comprises:
   determining, by the processing system, that the count of the counter is not equal to the expected number of responses, after the expiration of the predefined period of time;
   identifying, by the processing system in response to the determining, a first beacon responder of the plurality of beacon responders from which no response message has been received before the expiration of the predefined period of time; and
   indicating, by the processing system in response to the identifying, that a first fiber serving terminal to which the first beacon responder is connected is not functioning properly.

9. The method of claim 8, wherein every response message of the each response message includes a respective signature that uniquely identifies a beacon responder of the plurality of beacon responders that is a source of the each response message.

10. The method of claim 9, wherein the first fiber serving terminal is identified by determining that no response message of the each response message includes a signature that uniquely identifies the first beacon responder.

11. The method of claim 9, wherein the respective signature comprises a randomly generated bit that is added to the each response message.

12. The method of claim 8, further comprising:
   initiating, by the processing system, a remedial action to perform at least one of: a diagnosis of the first fiber serving terminal or a repair of the first fiber serving terminal.

13. The method of claim 12, wherein the remedial action comprises initiating a diagnostic process in order to attempt to identify a root cause of a failure of the first fiber serving terminal to function properly.

14. The method of claim 12, wherein the remedial action comprises sending instructions to a sensor to collect information about the first fiber serving terminal.

15. The method of claim 12, wherein the remedial action comprises scheduling an examination of the first fiber serving terminal by a technician.

16. The method of claim 12, wherein the remedial action comprises causing a device to push a software update to the first fiber serving terminal.

17. The method of claim 1, further comprising:
   repeating the broadcasting, the incrementing, and the generating.

18. The method of claim 17, wherein the repeating is performed according to at least one of: a predefined schedule, on a periodic basis, or on-demand.

19. A non-transitory computer-readable medium storing instructions which, when executed by a processing system of an optical splitter including at least one processor, cause the processing system to perform operations, the operations comprising:
   broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network;
   changing a counter in response to each response message that is received from the plurality of beacon responders in response to the beacon signal; and
   generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

20. An apparatus comprising:
   a processor; and
   a non-transitory computer-readable medium storing instructions which, when executed by the processing system, cause the processing system to perform operations comprising:
      broadcasting, from a central office of a passive optical network, a beacon signal to a plurality of beacon responders, wherein each beacon responder of the plurality of beacon responders is connected to a respective fiber serving terminal of a plurality of fiber serving terminals of the passive optical network;
      changing a counter in response to each response message that is received from the plurality of beacon responders in response to the beacon signal; and
      generating a report indicating which fiber serving terminals of the plurality of fiber serving terminals are functioning properly and which fiber serving terminals of the plurality of fiber serving terminals are not functioning properly, based on whether a count of the counter is equal to an expected number of responses, after an expiration of a predefined period of time.

* * * * *